May 31, 1938.  E. A. CORBIN, JR  2,118,808
HYDRAULIC BRAKE
Filed Oct. 3, 1936  3 Sheets-Sheet 2

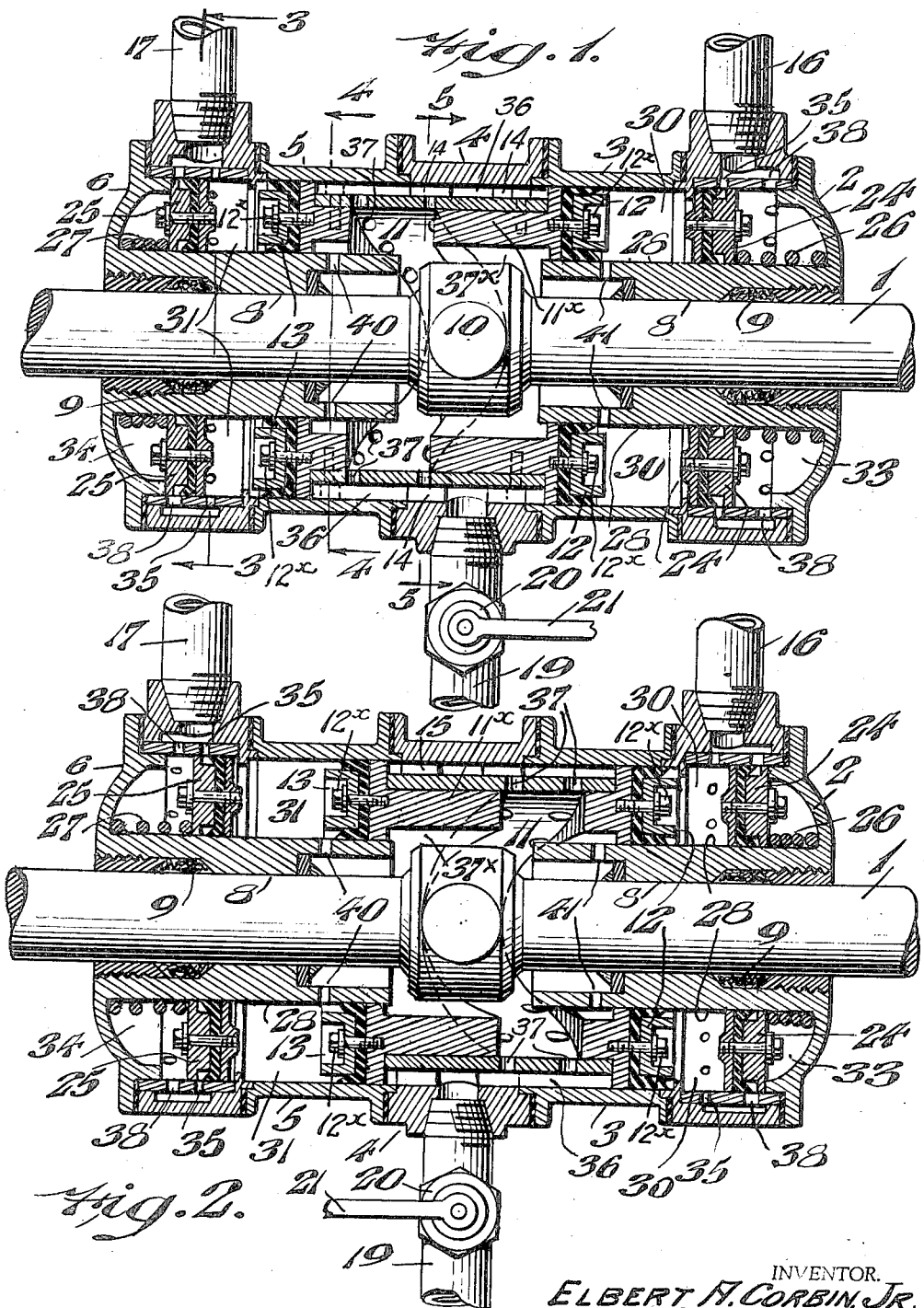

INVENTOR.
ELBERT A. CORBIN JR
ATTORNEY.

May 31, 1938. E. A. CORBIN, JR 2,118,808
HYDRAULIC BRAKE
Filed Oct. 3, 1936 3 Sheets-Sheet 3

INVENTOR.
ELBERT A. CORBIN, JR.
BY Louis Necho
ATTORNEY.

Patented May 31, 1938

2,118,808

UNITED STATES PATENT OFFICE 2,118,808

HYDRAULIC BRAKE

Elbert A. Corbin, Jr., Morton, Pa., assignor of one-half to William C. Biddle, Lansdowne, Pa.

Application October 3, 1936, Serial No. 103,845

3 Claims. (Cl. 188—90)

My invention relates to a new and useful hydraulic brake in which a turning shaft or axle pumps or circulates a predetermined amount of liquid within a casing, and in which interference with or complete stoppage of the free circulation of the liquid retards or completely stops the pumping or circulating action of the shaft and thus retards or completely arrests the movement of the latter.

My invention further relates to a brake of this character which is "double acting" so that its braking effectiveness is available instantaneously and at all times, regardless of the position of the parts when the braking action is applied.

My invention further relates to a brake of this character which is of a simple and compact construction so that it may be applied to or removed from any desired shaft or axle with minimum effort.

My invention further relates to a brake of this character in which means are provided for constantly "resetting" the brake mechanism and maintaining it in operative order at all times.

In the accompanying drawings:

Fig. 1 represents a longitudinal sectional view of a brake embodying my invention showing one extreme position of the parts.

Fig. 2 represents a view similar to Fig. 1 and showing the parts in the opposite extreme position.

Figure 3:
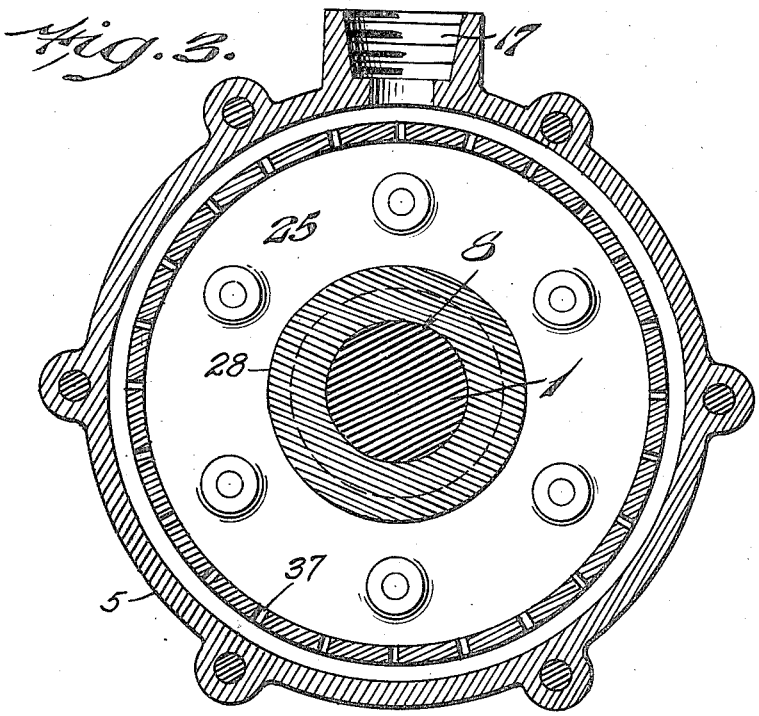
Figure 4:
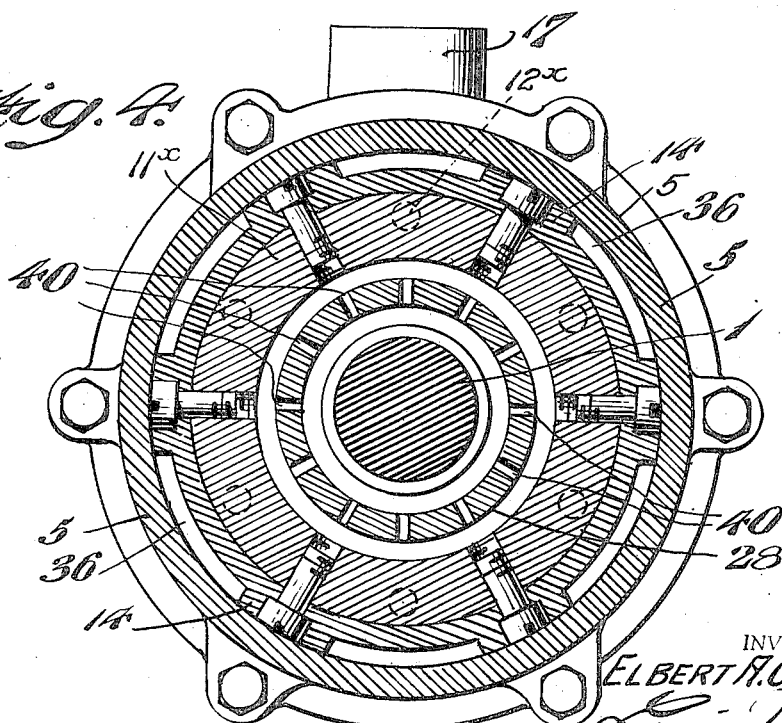
Figure 5:
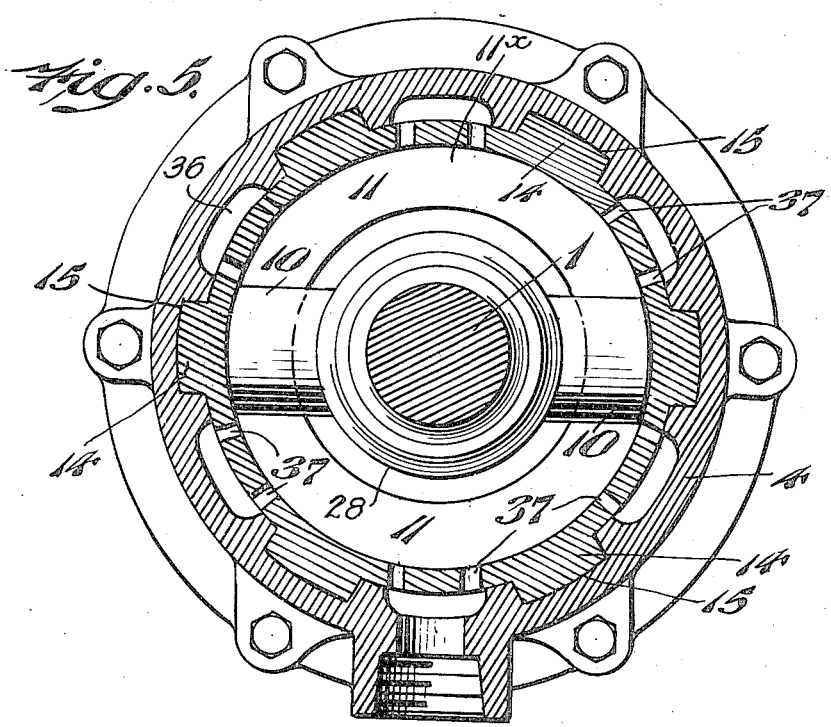
Figure 6:
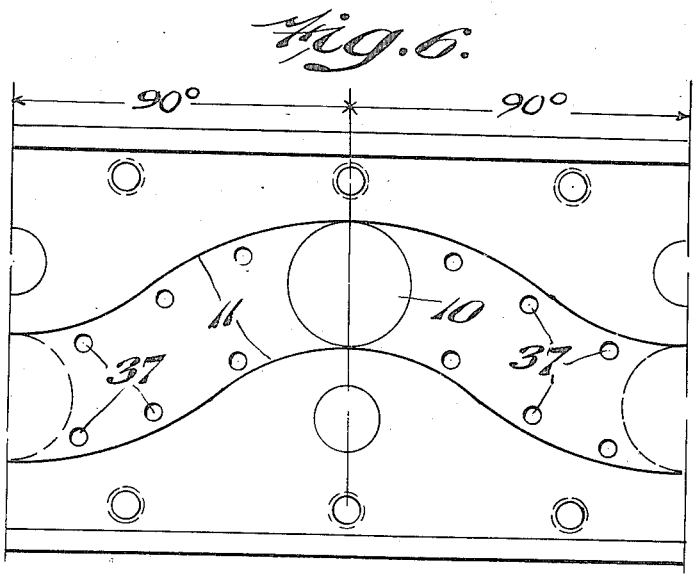

Fig. 3 represents a section on line 3—3 of Fig. 1.
Fig. 4 represents a section on line 4—4 of Fig. 1.
Fig. 5 represents a section on line 5—5 of Fig. 1.
Fig. 6 represents, in diagrammatic form, the eccentric drive forming part of my invention.

Referring to the drawings in which like reference characters indicate like parts, and more particularly to Figs. 1 and 2, 1 designates the rotor which may be any rotating shaft such as a drive shaft of an automobile, or the axle supporting the wheels of a vehicle, or the like on which it is desired to apply the hydraulic brake of my invention. The shaft 1 extends through a casing which is preferably formed of the sections 2, 3, 4, 5 and 6 for facilitating assembly, said sections being suitably secured together at their junctions by any desired fastening device, not shown. The portions 2 and 6 of the casing afford the bearing surfaces 8 for the shaft 1, which is also provided with the packing 9. The shaft 1 carries the pin 10, the opposite ends of which engage the eccentric groove 11 formed in a sliding head 11x which is annular in shape and which is provided, on the opposite ends thereof, with the annular pistons 12 and 13. The pistons 12 and 13 may be secured to the sliding head 11x by the bolts 12x or the like. The annular sliding head is also provided with the tongues or projections 14 which engage corresponding recesses or seats 15 formed on the inner faces of the outer casing to prevent rotation with the shaft during their reciprocation. From one side of the casing extend the outlet conduits 16 and 17, both of which lead into the inlet conduit 19 which is controlled by the valve 20 which, in turn, is operated by the arm 21 which may lead to a foot pedal, hand lever, or any other suitable position for convenient operation in closing and opening the valve 20. Juxtaposed to the pistons 12 and 13 are the annular sliding compression members 24 and 25 which are normally urged towards the center of the casing by the springs 26 and 27, the compression members 24 and 25 sliding along the surface 28. For convenience in description, the chamber between the annular piston 12 and the compression member 24 is designated as 30, and the chamber between the piston 13 and the compression member 25 is designated as 31. Similarly, the chambers formed between the compression members 24 and 25 and the respective outer ends of the casing are designated as 33 and 34.

The operation is as follows:

Assuming the parts to be in the position shown in Fig. 1 and assuming that the valve 20 is completely open, it will be seen that the rotation of the shaft 1 is translated through the engagement of the pin 10 with the groove 11 into a reciprocal movement of the piston 12 and 13 and reverses the position of the parts from that shown in Fig. 1 to that shown in Fig. 2. While the piston 12 is approaching the compression member 24 and the piston 13 is being pulled away from the compression member 25, the oil or other liquid in the chamber 30 pushes the compression member 24 to the right (see Fig. 2) so that the liquid contained in the chamber 30 is forced out through the ports 35 into the outlet 16, back into the inlet 19 and past the valve 20 into the chambers 36 through the ports 37 into the chamber 37x around the shaft 1. As will be best seen from Figs. 4 and 5 the chambers 36 are practically concentric with and surround the sliding head 11x. Some of the liquid in the system will pass through the ports 38 to fill the chamber 33 for a purpose hereinafter set forth. When the piston 12 has reached the position shown in Figure 2 the opposite piston 13 has receded away from the compression head 25 to the position shown in Fig. 2 so that some of the liquid in the chamber 37 now passes through the ports 40 into the chamber 31 ready for the action of the piston 13 on its reverse stroke. When the parts are in the position shown in Fig. 1, the chamber 30 is supplied with liquid through the ports 41. It is of course understood that the left hand portion of the device, as seen in Figs. 1 and 2, is identical in structure and operation with the right hand end thereof.

As long as the system is open, that is, as long as the valve 20 is open and the liquid is free to circulate or be pumped from the casing through the outlets 16 and 17 alternately and back into the casing through the inlet 19, the shaft 1 continues to rotate and is only retarded by the practically negligible resistance of the springs 26 and 27 together with the infinitesimal amount of friction that would be involved in the movement of the oil-immersed parts. If it is desired to stop the rotation of the shaft 1, the valve 20 is closed thus preventing the flow of the liquid from the outlet 16 and/or 17 into the inlet 19 and, if the parts are assumed to be in the position shown in Fig. 1, it will be seen that the liquid in the chamber 33, being incompressible, prevents any movement of the compression member 24, and the chamber 30 being completely filled with liquid, (as is the entire system) it effectively prevents any movement of the piston 12, and since the same is carried by the sliding head which has the groove 11 in which the pin 10 carried by the shaft 1 is engaged, it follows that the pin 10 and the shaft 1 are held stationary. Conversely, if the valve 20 is closed when the parts are in the position shown in Fig. 2, the liquid confined in the chamber 34 would prevent movement of the compression member 25 and thus stop the turning of the shaft 1 in the manner heretofore described.

By means of my double acting mechanism it will be seen that instantaneous action is achieved which is very important in connection with high speed machinery in which a fraction of a second can make a very great difference.

If the valve 20 is only partly closed, it will serve to retard the operation of the parts instead of completely stopping the same and will produce a slowing action instead of a complete stoppage.

Having thus described my inventoin, what I claim as new and desire to secure by Letters Patent is:

1. A hydraulic brake comprising, a casing, a shaft extending therethrough and rotatable independently of said casing, a head sliding within said casing and having an eccentric groove therein, a pin on said shaft engaging said groove whereby said sliding head is reciprocated by the rotation of said shaft, oppositely disposed pistons carried by said sliding head, slidable compression members near the opposite ends of said casing in juxtaposition to said pistons, means for normally urging said compression members towards said pistons, outlets leading from chambers to one side of said pistons to a common inlet conduit communicating with chambers to the other side of said pistons, a valve for said inlet conduit and means for actuating said valve.

2. A hydraulic brake comprising, a casing, a shaft extending therethrough and rotatable independently of said casing, a head sliding within said casing and having an eccentric groove therein, a pin on said shaft engaging said groove whereby said sliding head is reciprocated by the rotation of said shaft, oppositely disposed pistons carried by said sliding head and forming a variable central chamber therebetween, slidable compression members near the ends of said casing in juxtaposition to said pistons whereby variable intermediate chambers are formed between said compression members and said pistons, and whereby variable end chambers are formed between said compression members and the ends of said casing, means for normally urging said compression members towards said pistons, outlet conduits communicating alternately with said intermediate and end chambers and leading to a common inlet communicating with said central chamber, the communication of said outlet conduits with said intermediate and end chambers being controlled by the movement and position of said slidable compression members, a valve for said inlet conduit and means for actuating said valve, there being ports leading from said central chamber to the respective adjacent intermediate chambers said ports being alternately opened and closed by the reciprocation of said sliding head and said piston.

3. A hydraulic brake comprising a sectional casing, bearings carried by the end sections thereof, a shaft journaled in said bearings, pins carried by said shaft, a head sliding within said casing and having an eccentric groove therein adapted to be engaged by said pins, there being a central chamber formed on the inside of said sliding head adjacent said pins, pistons carried by said sliding head, compression members carried by the end sections of said casing in juxtaposition to said pistons, there being intermediate chambers formed between said pistons and said compression members communicating with said central chamber, means for normally urging said compression members towards said pistons, a fluid inlet leading to said central chamber, a pair of outlets leading from said intermediate chambers to said inlet, and means for closing or opening said outlets.

ELBERT A. CORBIN, JR.